United States Patent
Sudo et al.

[11] Patent Number: 5,853,833
[45] Date of Patent: Dec. 29, 1998

[54] SANITARY CONTAINER AND PRODUCTION PROCESS THEREOF

[75] Inventors: Morihiro Sudo; Yasushi Kawachi, both of Tokyo, Japan

[73] Assignee: Daikyo Seiko, Ltd., Tokyo, Japan

[21] Appl. No.: 801,112

[22] Filed: Feb. 14, 1997

[30] Foreign Application Priority Data

May 20, 1996 [JP] Japan ................................. 8-147837

[51] Int. Cl.$^6$ .................................................. C08L 65/00
[52] U.S. Cl. ......................... 428/36.6; 428/408; 428/336; 220/454; 220/457; 220/458; 427/419.1; 427/419.2; 427/419.5; 427/419.7; 427/249; 427/255.2
[58] Field of Search ................... 428/34.1, 36.6, 428/213, 336, 408; 220/454, 457, 458; 427/419.1, 419.2, 419.5, 419.7, 249, 255.2

[56] References Cited

U.S. PATENT DOCUMENTS

| | | | |
|---|---|---|---|
| 4,698,256 | 10/1987 | Giglia et al. | 428/216 |
| 4,756,964 | 7/1988 | Kincaid et al. | 428/408 |
| 4,809,876 | 3/1989 | Tomaswick et al. | 220/458 |

FOREIGN PATENT DOCUMENTS

| | | |
|---|---|---|
| 0 773 166 | 5/1997 | European Pat. Off. . |
| 94-189223 | 2/1996 | Japan . |

Primary Examiner—Charles Nold
Attorney, Agent, or Firm—Oblon, Spivak, McClelland, Maier & Neustadt, P.C.

[57] ABSTRACT

A sanitary container is composed of a base container made of a cyclic olefin polymer or its hydrogenation product and an inorganic coating formed on a surface of said base container. The sanitary container can be produced by forming the inorganic coating on the surface of the base container by plasma CVD.

6 Claims, 1 Drawing Sheet

SANITARY CONTAINER AND PRODUCTION PROCESS THEREOF

BACKGROUND OF THE INVENTION a) Field of the Invention

This invention relates to a sanitary container and a production process thereof. More specifically, the present invention is concerned with a sanitary container made of a cyclic olefin polymer or a hydrogenation product thereof and capable of stably storing a medicine such as a vaccine, antibiotic, vitamin or amino acid, a nutrient solution, a transfusion solution, a cosmetic, a food such as a seasoning agent, or the like over a long period of time while maintaining cleanliness, and also with a process for the production of the sanitary container.

b) Description of the Related Art

Glass-made containers have conventionally been used for many years as containers most suited from viewpoint of sanitation for medicines, nutrient solutions, transfusion solutions, foods and the like.

Glass-made containers are often made of soda-lime glass (soft glass), because soft glass as a raw material for the glass-made containers permits easy melting and molding, has chemical durability and is of low price. A container made of soft glass may however undergo a quality or property change at a glass surface thereof by moisture in the surrounding atmosphere or by a solution contained therein. Described specifically, the glass may be hydrolyzed with water so that an alkali ($Na^+$) may be dissolved out into the solution contained in the container or tiny chips called "flakes" may be formed.

Upon use of a glass-made container as a container for a sanitary product such as a medicine, the glass-made container may be subjected at an inner wall thereof to bloom treatment that the inner wall is treated with sulfur, sulfurous acid gas, ammonium sulfate or the like to eliminate alkalis, or a pH-regulating buffer, a quality or property change preventive or the like may be added to the content.

On the other hand, a container made of borosilicate glass (hard glass) undergoes alkali dissolution or flake formation, such as that mentioned above, less compared with a container made of soft glass. Hard glass is therefore most suited for the production of containers (ampoules) for injectable preparations, which containers (ampoules) require higher chemical durability. If the temperature or time is inadequate upon processing such as production of a container, hard glass may also become non-uniform in its glass structure so that an alkali may be dissolved out from an inner wall of the container or flakes may be formed from the inner wall of the container. To cope with this potential problem, surface treatment such as bloom treatment or fluoride treatment may be applied to the inner wall of the container, or silica coating or the like may be performed by coating $SiO_2$ on the inner wall of the container by a CVD process or the like and then conducting heat treatment to form a coating of $SiO_2$ there.

If a medicine, food or the like in a glass-made container is inferior in light resistance (ultraviolet light resistance), the transparency as a merit of the glass-made container conversely acts as a demerit. Iron-manganese compound or the like is therefore added to glass so that the glass-made container is used as a colored, light-shielding glass-made container. In this case, however, there is a potential problem that these metals may mix in the content such as the medicine or food.

Concerning the quality of glass upon its use as a material for medicine containers, standard values are specified under the "Testing Method for Glass Containers for Injectable Preparations" in The Pharmacopoeia of Japan (twelfth edition) (hereinafter abbreviated as "JP12"). Standard values are also specified in the United States Pharmacopeia XXII (hereinafter abbreviated as "USP17"), British Standards 3263 (hereinafter abbreviated as "BP"), and the like.

In addition to the above-described problem of dissolution-out of alkalis on glass-made containers, there is another potential problem that may arise upon opening glass-made ampoules. Recent ampoules include an increasing number of ampoules which like ampoules of the easy-cut type, can be easily opened without using any special tool. It has however been pointed out that like conventional ampoules, such recent ampoules also become dangerous due to formation of sharp edges at cut faces and upon being cut, they form glass chips having a potential danger when mixed in medicine solutions.

A glass-made container may have a still further problem that depending on the kind of a medicine, the glass-made container may adsorb thereon the medicine in a greater amount than a plastic-made container.

To avoid such problems, there is now an increasing tendency to adopt plastic-made containers in place of glass-made containers. As official standards for plastic-made containers, there are standards for polyethylene (PE), polypropylene (PP) and polyvinyl chloride (PVC) as specified in the eighth edition of the Pharmacopoeia of Japan (1971). Further, testing methods for plastic containers for transfusion solutions are also specified in the USP 17, the BS, the Pharmacopoeia of France, the Pharmacopoeia of Switzerland, Deutsche Industrie Norm (DIN—German Industrial Standards) (DIN58365), etc. They are also specified in Notification No. 370 of the Ministry of Health and Welfare issued under the Food Sanitation Law, Notification No. 20 of the same Ministry issued under the same Law (February, 1982), and the Food Additive Support F of U.S. Food and Drug Administration (FDA).

Plastics have an advantage over glass in that the former are lighter in weight than the latter. On the other hand, plastics are accompanied by disadvantages such that depending on the kinds of the plastics, they have poor moldability or formability and/or can provide only molded or otherwise formed products having insufficient strength and/or inferior gas transmission resistance and/or water vapor transmission resistance. It was therefore the situation that no plastics equipped in a well-balanced manner with properties required for sanitary containers had been found yet [see Japanese Patent Application Laid-Open (Kokai) No. HEI 5-293159].

With the foregoing situation in view, the present inventors conducted extensive research. As a result, it was found that a container made of a cyclic olefin polymer or a hydrogenation product thereof was equipped in a well-balanced manner with the properties required for sanitary containers. A patent application was therefore filed on the container [see Japanese Patent Application Laid-Open (Kokai) No. HEI 5-293159].

It was however come to the inventors' attention that sanitary containers making use of the above polymer are not fully satisfactory in the transmission resistance to oxygen and nitrogen.

SUMMARY OF THE INVENTION

An object of the present invention is therefore to provide a sanitary container, which is made of a cyclic olefin polymer or a hydrogenation product thereof, is excellent in oxygen transmission resistance and nitrogen transmission resistance, and can store a food, a medicine, a cosmetic, a seasoning agent or the like over an extended period of time while retaining its quality at the time of product (i.e., its initial quality). The above object has been achieved by the present invention. In one aspect of the present invention, there is thus provided a sanitary container comprising a base container made of a cyclic olefin polymer or a hydrogenation product thereof and an inorganic coating formed on a surface of the base container. In another aspect of the present invention, there is also provided a process for the production of a sanitary container, which comprises forming by plasma CVD an inorganic coating on a surface of a base container made of a cyclic olefin polymer or a hydrogenation product thereof.

The sanitary container according to the present invention is equipped with significantly-improved transmission resistance to oxygen and nitrogen owing to the provision of the inorganic coating.

Concerning the transmission rate of light at 290–450 nm in wavelength, the sanitary container according to the present invention can also meet the requirement for medical plastic containers.

BRIEF DESCRIPTION OF THE DRAWING

The above and other objects, features and advantages of the present invention will become apparent from the following description and the appended claims, taken in conjunction with the accompanying drawing in which:

DETAILED DESCRIPTION OF THE INVENTION AND PREFERRED EMBODIMENTS

Figure 1:
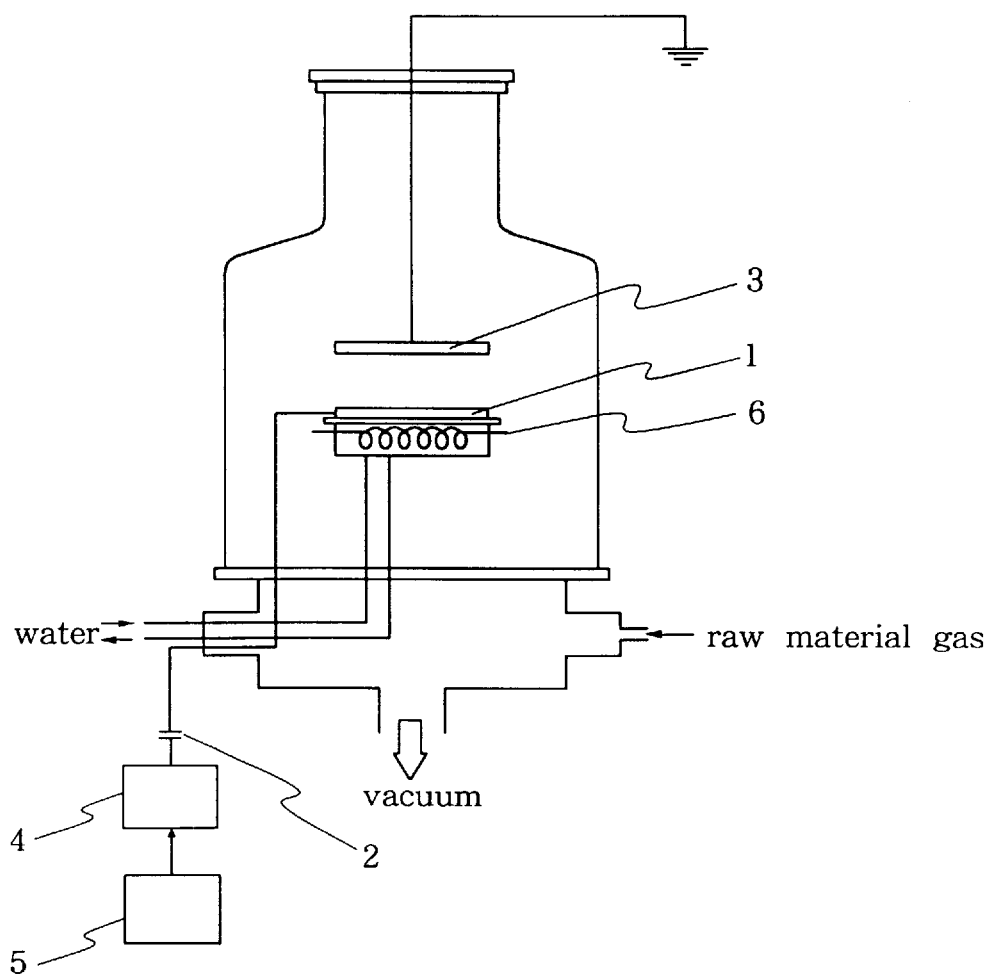
FIG. 1 is a schematic diagram of a DLC deposition reactor. The abbreviation "DLC" as used herein collectively means coatings of materials called diamond-like carbon, hydrogenated amorphous carbon, modified carbon and the like, respectively.

The cyclic olefin polymer or the hydrogenation product thereof, which is used for the production of the sanitary container according to the present invention, can be a ring-opened homopolymer of a cyclic olefin monomer, a ring-opened copolymer of a cyclic olefin monomer and another monomer, an addition homopolymer of a cyclic olefin monomer, an addition copolymer of a cyclic olefin monomer and another monomer, or a hydrogenation product of such a homopolymer or copolymer.

Examples of the cyclic olefin monomer include monocyclic olefin monomers, and polycyclic olefin monomers including bicyclic and higher cyclic compounds.

Illustrative of the monocyclic olefin monomer usable for the production of the homopolymer or copolymer of the cyclic olefin monomer are monocyclic olefin monomers such as cyclopentene, cyclopentadiene, cyclohexene, methylcyclohexene and cyclooctene; lower-alkyl derivatives thereof containing, as substituent groups, 1 to 3 lower alkyl groups such as methyl and/or ethyl groups; and acrylate derivatives thereof.

Illustrative of the polycyclic olefin monomer are dicyclopentadiene, 2,3-dihydrocyclopentadiene, bicyclo[2,2,1]-hepto-2-ene and derivatives thereof, tricyclo[4,3,0,1$^{2,5}$]-3-decene and derivatives thereof, tricyclo[4,4,0,1$^{2,5}$]-3-undecene and derivatives thereof, tetracyclo[4,4,0,1$^{2,5}$,0$^{7,10}$]-3-dodecene and derivatives thereof, pentacyclo[6,5,1,1$^{3,6}$,0$^{2,7}$,0$^{9,13}$]-4-pentadecene and derivatives thereof, pentacyclo[6,6,1,1$^{3,6}$,0$^{2,6}$,0$^{9,14}$]-4-hexadecene and derivatives thereof, and hexacyclo[6,6,1,1$^{3,6}$,0$^{10,13}$,0$^{2,7}$,0$^{9,14}$]-4-heptadecene and derivatives thereof.

Examples of bicyclo[2,2,1]-hepto-2-ene derivatives include 5-methyl-bicyclo[2,2,1]-hepto-2-ene, 5-methoxy-bicyclo[2,2,1]-hepto-2-ene, 5-ethylidene-bicyclo[2,2,1]-hepto-2-ene, 5-phenyl-bicyclo[2,2,1]-hepto-2-ene, and 6-methoxycarbonyl-bicyclo[2,2,1]-hepto-2-ene.

Examples of tricyclo[4,3,0,1$^{2,5}$]-3-decene derivatives include 2-methyl-tricyclo[4,3,0,1$^{2,5}$]-3-decene and 5-methyl-tricyclo[4,3,0,1$^{2,5}$]-3-decene.

Examples of tricyclo[4,4,0,1$^{2,5}$]-3-undecene derivatives include 10-methyl-tetracyclo[4,4,0,1$^{2,5}$]-3-undecene.

Examples of tetracyclo[4,4,0,1$^{2,5}$,0$^{7,10}$]-3-dodecene derivatives include 8-ethylidene-tetracyclo[4,4,0,1$^{2,5}$,0$^{7,10}$]-3-dodecene, 8-methyl-tetracyclo[4,4,0,1$^{2,5}$,0$^{7,10}$]-3-dodecene, 9-methyl-8-methoxycarbonyl-tetracyclo[4,4,0,1$^{2,5}$,0$^{7,10}$]-3-dodecene, 5,10-dimethyl-tetracyclo[4,4,0,1$^{2,5}$,0$^{7,10}$]-3-dodecene.

Examples of hexacyclo[6,6,1,1$^{3,6}$,1$^{10,13}$,0$^{2,7}$,0$^{9,14}$]-4-heptadecene derivatives include 12-methyl-hexacyclo[6,6,1,1$^{3,6}$,1$^{10,13}$,0$^{2,7}$,0$^{9,14}$]-4-heptadecene and 1,6-dimethyl-hexacyclo[6,6,1,1$^{3,6}$,1$^{10,13}$,0$^{2,7}$,0$^{9,14}$]-4-heptadecene.

One example of the cyclic olefin polymer is an addition homopolymer of at least one cyclic olefin monomer or an addition copolymer of at least one cyclic olefin monomer and at least one other monomer (for example, ethylene, propylene, 4-methylpentene-1, cyclopentene, cyclooctene, butadiene, isoprene, styrene or the like). This homopolymer or copolymer can be obtained by polymerizing the above monomer or monomers, for example, while using as a catalyst a known catalyst which is soluble in a hydrocarbon solvent and is composed of a vanadium compound or the like and an organoaluminum compound or the like [Japanese Patent Application Laid-Open (Kokai) No. HEI 6-157672, Japanese Patent Application Laid-Open (Kokai) No. HEI 5-43663, etc.].

Another example of the cyclic olefin polymer is a ring-opened homopolymer of the above monomer or a ring-opened copolymer of the above monomers. It can be obtained by homopolymerizing the above monomer or copolymerizing the above monomers, for example, while using as a catalyst a known catalyst such as (1) a catalyst composed of a halide or the nitrate of a platinum group metal such as ruthenium, rhodium, palladium, osmium or platinum and a reducing agent or (2) a catalyst composed of a compound of a transition metal such as titanium, molybdenum or tungsten and an organometal compound of a metal in one of Groups I to IV of the periodic table such as an organoaluminum compound or organotin compound [Japanese Patent Application Laid-Open (Kokai) No. HEI 6-157672, Japanese Patent Application Laid-Open (Kokai) No. HEI 5-43663, etc.].

Where the homopolymer or copolymer obtained as described above contains unsaturated bonds, the homopolymer or copolymer is hydrogenated by using a known hydrogenation catalyst. Examples of the hydrogenation catalyst include (1) Ziegler-type homogeneous catalysts which are each composed of an organic acid salt of titanium, cobalt, nickel or the like and an organometal compound of lithium, aluminum or the like, (2) supported catalysts which are each composed of a carrier such as carbon or alumina and a platinum metal such as palladium or ruthenium supported on the carrier, and (3) catalysts which are each composed of a complex of one of the above-described platinum group metal [Japanese Patent Application Laid-Open (Kokai) No. HEI 6-157672].

In the present invention, examples of the above-described hydrogenated homopolymer or copolymer include ring-opened homopolymers or copolymers and addition homopolymers or copolymers of polycyclic saturated hydrocarbon compounds containing two or more rings, which polycyclic saturated hydrocarbon compounds may have one or more substituent groups containing a polymerizable double bond.

Examples of such polycyclic hydrocarbon compounds include tricyclo[4,3,0,1$^{2,5}$]-decane, bis(allyloxycarboxy)-tricyclo[4,3,0,1$^{2,5}$]-decane, bis(methacryloxy)-tricyclo[4,3,0,1$^{2,5}$]-decane, and bis(acryloxy)-tricyclo[4,3,0,1$^{2,5}$]-decane.

If an unreacted monomer, a low molecular weight oligomer, a polymerization metal catalyst, a hydrogenation metal catalyst or the like remains in the above-described cyclic olefin polymer employed in the present invention, an offensive odor is given off or the cleanliness of a content of a container is reduced when molded into a container. It is therefore preferred to fully purify the above-described polymer and to use the resulting impurity-free polymer for the production of containers.

The above-described polymer preferably has a softening point of at least 130° C. as measured in accordance with ASTM D1525 and a bromine number of at most 1 as measured in accordance with JIS K2543. A polymer whose bromine number is greater than 1 is not preferred, because a sanitary container obtained from the polymer undergoes coloration or discoloration. As a method for preventing such coloration or discoloration of the polymer or container, a known age resister whose use has been approved from the standpoint of food sanitation can be added.

Upon production of the sanitary container according to the present invention, the polymer useful in the practice of the present invention can be used by blending or alloying it with one or more other plastic materials or rubbery polymers to an extent not impairing properties required when molded into the container. Examples of such other plastic materials include various polyethylenes, polypropylene, various nylons, polyethylene terephthalate, polybutylene terephthalate, and ethylene-acrylic acid copolymers. Examples of such rubbery polymers include isoprene rubber, butadiene rubber, butadiene-isoprene copolymer rubbers, ethylene-propylene copolymer rubbers, ethylene-propylene-base terpolymers, butyl rubber, and brominated butyl rubber.

The sanitary container according to the present invention features the formation of an inorganic coating on an outer wall of a base container formed in a desired shape from the cyclic olefin polymer or the hydrogenation product thereof or the formation of inorganic coatings on both the outer wall and an inner wall of the base container.

The term "inorganic coating" as used herein means an inorganic coating deposited and formed on an wall surface of a base container from one of various raw materials by a physical vapor-phase deposition process (PVD) such as ion beam sputtering, a reduced-pressure chemical vapor-phase deposition process (CVD), a plasma-assisted CVD process or the like, such as a diamond-like carbon coating, a modified carbon coating, a titanium oxide coating, a silicon oxide coating, a silicon carbide coating or a silicon nitride coating. A particularly preferred inorganic coating is a diamond-like carbon coating or a modified carbon coating.

These particularly preferred carbonaceous coatings are carbonaceous coatings deposited and formed on wall surfaces of base containers by PVD, CVD, plasma-assisted CVD or the like from raw materials such as graphite; aromatic hydrocarbons such as benzene and toluene; fluorinated aliphatic hydrocarbons such as monofluoroethane, difluoroethane and mono- to trifluoropropanes; fluorinated aromatic hydrocarbons such as monofluorobenzene, p-fluorobenzene and p-fluorotoluene ($FC_6H_4$—$CH_3$); mixtures of hydrocarbons and fluorine-containing hydrocarbons; and mixtures of hydrocarbons and fluorinated hydrocarbons (for example, hexafluoroethane, perfluoropropane, hexafluorobenzene, and perfluorotoluene), and mean coatings of materials called diamond-like carbon, hydrogenated amorphous carbon, modified carbon and the like (hereinafter abbreviated as "DLC").

The above inorganic coating can be formed either as a single layer or as plural layers. For example, it is possible to form a diamond-like carbon coating from a hydrocarbon by CVD and then to deposit a modified carbon coating over the diamond-like carbon coating by using a mixed gas of a hydrocarbon and nitrogen. These coatings can be formed in an opposite order. In addition, a lubricant layer can be formed on a surface of the inorganic coating to prevent separation or peeling of the inorganic coating.

In the present invention, the polymer or the hydrogenation product thereof can be added with one or more other plastics and one or more additives such as an age resister and processing aids as needed, followed by the mixing of the resultant mixture in a known mixer such as an internal mixer, kneader, roll mixer, Banbury mixer or extruder. The thus-obtained mixture (composition) is then molded into the form of a desired container by a molding process such as injection molding, extrusion or compression molding (die molding or blow forming), whereby a sanitary container is produced. No particular limitation is imposed on the shape of the sanitary container, but examples of the sanitary container may include ampoules, vials, bottles and the like.

As a process for forming a coating of DLC on a surface of the sanitary container, it is possible to use a PVD process that a graphite target is sputtered by $Ar^+$ ion beams of 500–1,000 eV in an ion-beam sputtering system. As an alternative, a CVD process or a plasma-assisted CVD process can also be used.

No particular limitation is imposed on the process which is usable for the deposition of the inorganic coating in the present invention. However, a description will hereinafter be made about a process for the formation of an inorganic coating by plasma-assisted CVD (chemical vapor deposition).

CVD is a process that a feed gas is supplied onto a heated substrate and a substance formed through a chemical reaction is caused to deposit as a solid on the substrate to form a coating.

Plasma-assisted CVD is performed using the activity of excited neutral particles contained in a plasma. In the field of semiconductors, this process is used to form thin films or coatings of silicon oxide or silicon nitride for the purpose of insulation between layers or protection from the surrounding atmosphere in multilayered devices. It features the provision of a dense and uniform coating.

A coating of diamond-like carbon by plasma-assisted CVD can be formed, for example, as will be described below. A hydrocarbon as such as methane, ethane, ethylene or isobutane is used as a diamond-like-carbon-forming raw material. In a parallel-plate plasma reactor, for example, a radio frequency voltage is applied via a blocking capacitor to an electrode (cathode) arranged in opposition to a grounded electrode (anode) with a predetermined interval left therebetween. By the application of the radio frequency voltage, a self-bias is produced at a dark place (sheath) on the former electrode (cathode). Ions are accelerated by the self-bias so that a coating of diamond-like carbon can be formed. One example of the parallel-plate plasma reactor is schematically illustrated in FIG. 1.

The reactor shown in FIG. 1 is of the parallel-plate, internal electrode type. To a side of a lower electrode (cathode) 1, a radio frequency voltage (13.56 MHz) is applied from an RF generator 4 via a self-biasing block capacitor 2. A dark space (sheath) is produced in the thus-applied lower electrode (cathode), so that a negative potential relative to the grounded opposing electrode (anode) 3, namely, a self-bias is produced. It is the characteristic feature of this reactor that a coating of diamond-like carbon is formed using the self-bias produced in the sheath space.

A base container on which at least one coating of diamond-like carbon is to be formed is mounted on the lower electrode (cathode) 1. Under reduced pressure, a radio frequency voltage is applied in the presence of a diamond-like-carbon-forming feed gas, whereby a high-density, hard, amorphous, diamond-like carbon coating is formed on at least one of outer and inner walls of the base container.

The thickness of the thus-formed diamond-like carbon coating can be varied in a range of from the order of Å to 1–5 $\mu$m or so by adjusting the output of the applied high frequency voltage, the decomposition time of the feed gas, the self-bias, the vacuum level, the temperature of the base container and/or the like. The output of the applied high frequency voltage can be controlled by a controller 5, whereas the temperature of the base container can be adjusted by controlling the temperature of a heater 6.

No particular limitation is imposed on the thickness of the diamond-like carbon coating in the present invention but a thickness of 0.1 to 1 $\mu$v or so can generally achieve substantial prevention of transmission of oxygen and/or nitrogen through the wall of the sanitary container. Further, this thickness can also bring about the advantage that transmission of ultraviolet rays can also be inhibited.

Incidentally, a modified carbon coating can also be formed in the same manner as the above-described formation of the diamond-like carbon coating.

The present invention will hereinafter be described more specifically by the following Examples.

EXAMPLE 1

Using a commercial cyclic olefin polymer ("Zeonex", trademark; product of Nippon Zeon Co., Ltd.), ampoules for an injectable preparation (diameter: 10.0 mm, thickness: 0.3 mm) were produced by injection molding.

A diamond-like carbon coating was formed on an outer wall of one of the ampoules by using the plasma-assisted CVD reactor shown in FIG. 1. As conditions for the formation of the diamond-like carbon coating, the ampoule was mounted on the lower electrode (cathode) 1, and the frequency and output of a radio frequency voltage to be applied were set at 13.56 MHz and 200 W, respectively.

As a pretreatment, the ampoule was first treated with argon gas at a vacuum level of 0.1 Torr and room temperature for 10 seconds. The ampoule was then treated with a mixed gas of isobutane and argon at a vacuum level of 0.07 Torr and room temperature for 10 seconds, whereby a diamond-like carbon coating was formed on the outer wall of the ampoule (coating thickness: 2,200 Å).

Using the diamond-like-carbon-coated ampoule so obtained, the transmission rates of oxygen and nitrogen were measured at room temperature by a gas transmission measuring instrument ("GPM-250", trade name) manufactured by GL Science Company.

Assuming that the transmission rates of oxygen and nitrogen are each 1 in the case of the ampoule not applied with the diamond-like carbon coating, the transmission rates of oxygen and nitrogen in the case of the ampoule applied with the diamond-like carbon coating are 0.3 and 0.7, respectively, so that the transmission rates of oxygen and nitrogen were both lowered significantly.

Further, the transmission rate of light of 200–900 nm in wavelength was also measured by a double-beam spectrophotometer ("Model 150-20", trade name; manufactured by Hitachi Ltd.) (relative to air). The transmission rate was 15% or lower at wavelengths of from 290 to 450 nm and 45% or higher at wavelengths of from 590 to 610 nm. In the case of the ampoule not applied with the diamond-like carbon coating, the corresponding transmission rates were 90% or higher and 95%, respectively.

EXAMPLE 2

Using the commercial cyclic olefin polymer ("Zeonex", trademark; product of Nippon Zeon Co., Ltd.), vials of 1.50 mm in thickness and 36.00 mm in diameter were produced by injection molding. In a similar manner as in Example 1, a diamond-like carbon coating (thickness: 2,500 Å) was applied on an outer wall of one of the vials.

Using the vials so obtained, the transmission rates of oxygen and nitrogen were measured at room temperature. Assuming that the transmission rates of oxygen and nitrogen are each 1 in the case of the vial not applied with the diamond-like carbon coating, the transmission rates of oxygen and nitrogen in the case of the vial applied with the diamond-like carbon coating are 0.4 and 0.8, respectively, so that the transmission rates of oxygen and nitrogen were both lowered significantly.

EXAMPLE 3

A diamond-like-carbon-coated vial was produced in a similar manner as in Example 2 except that the commercial cyclic olefin polymer was replaced by another commercial product ("Apel", trademark; product of Mitsui Petrochemical Industries, Ltd.). Its transmission rates of oxygen and nitrogen were measured. The results were substantially the same as in Example 2.

EXAMPLE 4

Vials were produced in a similar manner as in Example 1 except that toluene was used instead of the hydrocarbon and the plasma treatment was applied for 3 minutes at a radio frequency output of 100 W. In the case of the vial not subjected to the plasma treatment (control), the transmission rate of oxygen was 392.0 ($cm^3/m^2 \cdot 24$ hr·atm) and the transmission rate of nitrogen was 117.5 ($cm^3/m^2 \cdot 24$ hr·atm). When subjected to the plasma treatment, they were considerably lowered to 158.6 and 110.4, respectively.

Further, the transmission rate of an ultraviolet ray having a wavelength of 450 nm was 12.0% in the case of the plasma-treated vial as opposed to 90.7% in the case of the blank, thereby confirming the possession of ultraviolet ray transmission resistance. The transmission rates of visible light of 590 nm in wavelength were 91.3% and 49.8%, respectively.

EXAMPLE 5

A vial with a diamond-like carbon coating applied on an outer wall thereof was produced in a similar manner as in Example 2 except that p-fluorotoluene was used in place of the hydrocarbon, the radio frequency output was set at 100 W, and the treatment was conducted for 2 minutes in argon, for further 2 minutes with addition of p-fluorotoluene, and for still further 2 minutes with further addition of p-fluorotoluene. After the treatment, the ultraviolet ray transmission rate and visible light transmission rate of the resultant vial were 12.4% and 51.5%, respectively.

What is claimed is:

1. A sanitary container comprising:
    a base container made of a ring-opened homopolymer of a cyclic olefin monomer or a hydrogenation product thereof; and
    an inorganic coating formed on a surface of said base container, wherein said inorganic coating is a diamond-like carbon coating, a modified carbon coating, a titanium oxide coating, a silicon oxide coating, a silicon carbide coating, or a silicon nitride coating and has a thickness in a range of 0.1 to 1 $\mu$m.

2. The sanitary container according to claim 1, wherein said inorganic coating is a diamond-like carbon coating or a modified carbon coating.

3. The sanitary container according to claim 1, wherein said cyclic olefin homopolymer or said hydrogenation product thereof has a softening point of at least 130° C. as measured in accordance with ASTM D1525 and a bromine number of at most 1 as measured in accordance with JIS K2543.

4. The sanitary container of claim 1, wherein the coating is on the outside of the container or on both the outside and inside of the container.

5. The sanitary container of claim 1, wherein said inorganic coating comprises a layer of a diamond-like carbon coating and a layer of a modified carbon coating.

6. A process for the production of a sanitary container, which comprises forming by plasma CVD an inorganic coating on a surface of a base container made of a ring-opened homopolymer of a cyclic olefin monomer or a hydrogenation product thereof, wherein said inorganic coating is a diamond-like carbon coating, a modified carbon coating, a titanium oxide coating, a silicon oxide coating, a silicon carbide coating, or a silicon nitride coating and has a thickness in a range of 0.1 to 1 $\mu$m.

* * * * *